Patented July 21, 1953

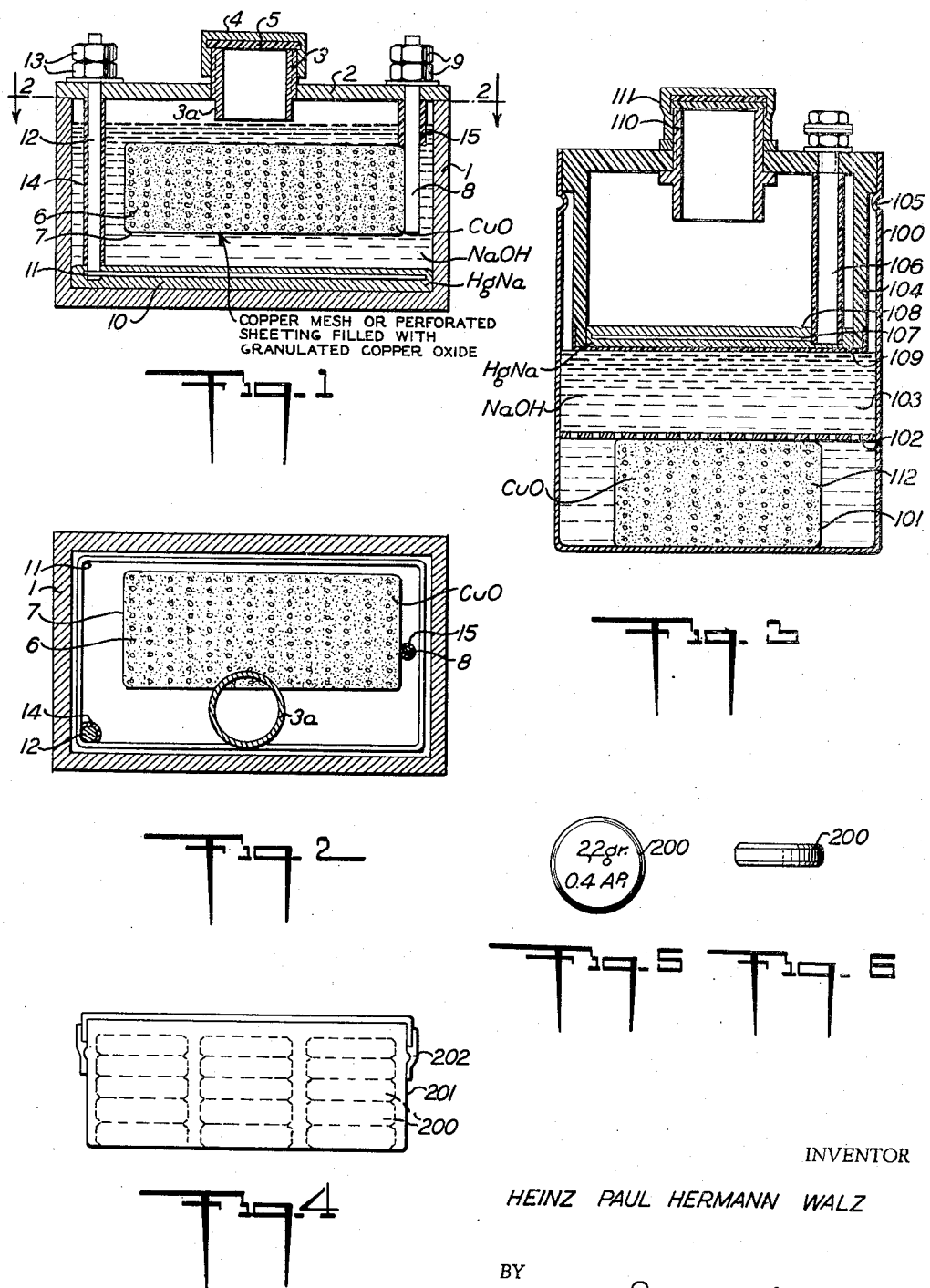

2,646,458

UNITED STATES PATENT OFFICE 2,646,458

GALVANIC CELL

Heinz Paul Hermann Walz, Heidelberg, Germany

Application August 26, 1949, Serial No. 112,537
In Great Britain July 30, 1948

7 Claims. (Cl. 136—100)

This invention relates to galvanic cells and has for its main object to provide a cell capable of utilizing the oxidising properties of alkali metals.

According to the invention, there is provided a galvanic cell having an electrolyte consisting of an alkaline lye, a positive electrode of carbon or a metal oxide substantially insoluble in the lye, for example $CuO$, $Ag_2O$, or $NiO_2$, and a negative electrode comprising mercury containing an alkali metal which is oxidised during the evolution of electrical energy.

The alkali metal in the amalgam negative electrode is preferably sodium which is present as a small percentage by weight. The electrodes are immersed in an alkaline electrolyte such as KOH or NaOH and provide a substantially constant voltage the value of which is determined by the nature of the positive electrode, the alkali metal content of the amalgam electrode, and the concentration of the alkaline lye electrolyte.

As an example, the positive electrode is formed from silver oxide, the electrolyte consists of caustic soda having a specific gravity of approximately 1.2, and the amalgam electrode consists of a liquid electrode containing, by weight, approximately 0.5 per cent of sodium (i. e. 0.5 gramme sodium to 99.5 grammes mercury). This cell, it has been found, produces an E. M. F. of approximately 2.4 volts. If a copper oxide electrode is substituted for the silver oxide electrode the E. M. F. produced is about 1.6 volts, and if a carbon electrode is employed instead of the silver oxide electrode the E. M. F. produced is about 1.9 volts.

In the example just described, the amalgam electrode can be charged up to about 0.1 ampere per square centimetre and, when sodium is employed, the ampere-hour efficiency with respect to the sodium is 80 to 90 per cent of the theoretical value (23 grammes sodium for 26.8 ampere-hours) so that one gramme of sodium will produce approximately one ampere-hour of electrical energy.

A cell as just described is reversible and can, therefore, be used as an accumulator. Further, a suitable form of primary cell is obtained if the positive electrode consists of carbon or of copper oxide.

It will be appreciated that when a carbon electrode is employed oxygen from the air effects depolarisation as is the case in cells of the well-known Leclanche type.

When, however, a copper oxide electrode is employed, oxygen from the air also enters into the reaction because copper oxide, when supplying current, as is well-known, is converted to cuprous oxide or copper which, in warm air, is easily reoxidised to copper oxide.

The cell according to the invention is adapted to supply a substantially constant voltage provided that care is taken to maintain the concentration of the amalgam and of the electrolyte at substantially the specified degrees of concentration. The amalgam concentration can be maintained by arranging for the intermittent or continuous addition of metallic sodium or potassium to the mercury electrode, or for the addition of an admixture of liquid sodium and potassium, the addition being effected, for example by a pipe, so that contact is not made with the electrolyte.

Concentration of the electrolyte may be maintained by providing the cell with means whereby some of the electrolyte can be withdrawn from the cell and water added thereto.

An alternative manner of maintaining the concentration of the amalgam comprises the employment of an amalgamation chamber separated from the cell. This chamber contains mercury to which the alkali metal, for example, sodium, is added in any suitable manner. The amalgam so formed is circulated through the cell but to permit this circulation a very liquid amalgam is necessary, the alkali metal content being under 0.8 per cent by weight. It has been found that good results can be obtained when the alkali metal content is about 0.5 per cent.

When the cell is to be employed in small batteries, for example for use in lighting, wireless, or telephone systems, it is found to be advantageous, when the cell is not in use, to withdraw the copper oxide electrode from the electrolyte and expose it to atmospheric air so that it becomes regenerated. This action may be facilitated by swinging the electrode in the air. The negative electrode is preferably maintained by the addition to the mercury of solid sodium amalgam having a sodium content of 23 per cent by weight. This amalgam is a very hard and well defined substance and is prepared in the form of small balls similar to shot. The balls are housed in a chamber filled with petroleum and are permitted to fall, as required, through the electrolyte and into the layer of mercury at the bottom of the cell. The balls spread rapidly and on contact with the mercury cause an instantaneous generation of electrical energy.

It is found that a small cell having a copper oxide positive electrode, a caustic soda electrolyte, and a sodium amalgam negative electrode will provide a substantially constant E. M. F. of about 1.3 volts with the amalgam electrode charged up to about 0.1 ampere per square centimeter, so that with the addition to the mercury of 1 gramme of 23 per cent sodium amalgam it is possible to obtain approximately 0.3 watt-hour of electrical energy.

The copper oxide electrode can be produced in well-known manner, for example, in its simplest form, the electrode consists of copper oxide granules contained in a copperwire bag.

The 23 per cent sodium amalgam may be prepared by heating a quantity of mercury in petroleum to about 100° C. and adding the sodium by small increments until the desired weight thereof, 23 parts by weight, has been added.

In the above described forms of execution of the invention there a tendency to self discharge is observable therefore further features of the invention concern the removal of this tendency. The achievement of this result would make it possible not to have to charge the cell before every large current ouput with the activating substances, but with a large quantity thereof at once, sufficient to operate for several days. It has been observed that the sodium concentration in the mercury electrode greatly increases towards the surface and is a maximum thereat, therefore in the mercury electrode immersed in the electrode the tendency to self discharge is comparatively great. Also foreign substances present in the cell substantially contribute to self discharge because they float on the mercury and are also present in the mercury-electrolyte interface.

The solution of the resulting auxiliary problem, namely, to furnish sodium to the electrolyte in sufficient concentration and amount and practically independently of the sodium supply in the cell, also, to keep foreign substances away from the mercury electrolyte interface, is now seen to lie in holding the mercury of the negative electrode above the electrolyte by means of an alkali permeable diaphragm in such a manner that the electrolyte cannot cover the mercury surface. Preferably the diaphragm forms the bottom of a separate vessel provided with the negative pole and a closable inlet duct for the alkali activating substance. This vessel can also form the closure for the cell casing.

In a particularly convenient example of execution the cell casing consists of metal and constitutes, being in conductive connection to the positive electrode, the positive pole of the cell. The positive electrode is preferably in the form of a wire mesh bag containing for example copper oxide held in current conducting contact with the bottom of a pot shaped cell casing by means of partition permeable by the electrolytes and arranged in the cell casing. According to a further feature of the invention a thickened or dry electrolyte, known per se, can be used whereby a cell is obtained which approaches very closely in utility to a dry cell.

The use of solid amalgam, preferably with 23 per cent by weight of sodium for activating the negative electrode, is very convenient for example for the operation of portable radio apparatus. According to another feature of the invention such a solid amalgam can be provided in convenient shaped units, for example as tablets, cubes, or pellets corresponding to a predetermined electrical output. The owner of the apparatus thus will know how long his apparatus can operate after insertion of a given number of tablets, and how long his supply of amalgam units will last.

It has been found useful to make the amalgam tablets of a weight of 2.2 grammes. The cell will yield, with one such tablet, at a working voltage of about 1.1 volt, about 0.4 ampere-hour, thus it is directly possible to obtain a prescribed operation period by inserting a corresponding number of tablets.

For further facility of operation the tablets can be prepared resistant to air exposure. Preferably this is done by immersing them in petroleum and storing in a closed vessel, that is in the presence of petroleum. Petroleum is known to have the property of creeping and coats the amalgam tablets in a closed vessel with a thin layer, or it adheres in a thin layer after immersion, which prevents the destroying action of the air. It has been found, that a can holding 50 or 100 tablets previously immersed in petroleum, will keep the tablets in good condition for months, even if they are removed singly. Furthermore the petroleum impregnation produces no detrimental action in the cell. Amalgam tablets impregnated with petroleum or oil can be touched by the hand without danger.

Several forms of execution of the invention are shown in the drawings, in which

Figure 1 shows the first example of execution, as a cell viewed from the side, partly in section, Figure 2 is a top plan view of Fig. 1, the cell walls consisting of transparent material, Figure 3 is a sectional elevation of a second form of execution of a galvanic cell approaching a dry cell in utility, Figures 4 to 6 are side views showing details.

The cell depicted in Figs. 1 and 2 is intended specially for use as a heating battery in portable electronic valve apparatus. It consists of a case 1, composed of transparent unbreakable plastic or metal (iron, nickel, or copper). 2 illustrates the lid of the case which is screwed on. The filler-hole 3 is set into a hole in the lid of the case. This filler protrudes below the lid by the distance 3a. The purpose of this contrivance will be described later. A screwcap 4 with a gasket or washer 5 ensures airtight sealing of the filler. The filler 3 is placed at one side so that when activating substances are introduced they may drop directly to the bottom of the holder and unimpeded by the electrodes.

The positive electrode consists of a bag of copper wire mesh or perforated copper sheeting 7 filled with granulated copper oxide 6. The bag is supported by the copper bar 8 with a terminal 9 at the top.

The negative electrode consists of a sodium amalgam filling 10 in which is immersed a looped copper wire 11 which has been bent into a rectangle in the position illustrated. The loop itself is fixed to the copper bar 12 which carries the terminal 13. The wire loop lies close to the bottom of the cell in close proximity to the side-walls of the case so that it is still sufficiently immersed in the liquid electrode if the case lies on one of its four sides.

The copper bars 8 and 12 are encased in tubes 14 and 15 respectively which consist of some material which cannot be corroded by the alkaline lye electrolyte, preferably a synthetic resin.

To operate the cell a quantity of solid sodium amalgam proportionate to the probable duration of reception is added to an electrolyte of caustic soda of an approximate density of 1.05 to 1.2. If amalgam containing 23% of sodium by weight is used then 1 gramme of amalgam generates 0.18 amp.-hour. It was found advisable to produce tablets of 2.2 grammes in weight which generate 0.4 amp.-hour.

A great merit of this cell is that, if it is well sealed, it can be stored for any length of time and in any position either when new or at any time during use. On the other hand it can be made ready for immediate operation merely by inserting an amalgam tablet. In the case of a longer period of reception 2 or 3 tablets may be inserted at the same time with perfect safety.

The E. M. F. on open circuit amounts to about 1.4 volt with the temperature of the electrolyte at approximately 20° C., the working voltage with a sustained load of 0.3 ampere amounts to about 1.1 volt with a lye density of 1.07 to 1.2. This performance is maintained constant and with a capacity of 40 amp.-hours by a battery measuring 76×53×81 millimeters which contains a lye volume of 150 cm.³, a mercury volume of 80 grammes and 80 grammes of granulated copperoxide, whether the battery is used continuously or intermittently. The total weight of amalgam inserted is 220 grammes (i. e. 100 tablets of 2.2 grammes each). The mercury in the tablets increases the electrode mercury and the sodium raises the concentration of the lye as the water is used up.

The principal chemical changes take place as follows:

$$2Na + 2H_2O \rightarrow 2NaOH + H_2 \qquad (1)$$
$$2CuO + H_2 \rightarrow Cu_2O + H_2O \qquad (2)$$
$$Cu_2O + H_2 \rightarrow 2Cu + H_2O \qquad (3)$$

and Reactions 2 and 3 take place more or less simultaneously. Besides the increased concentration of the lye the copper oxide is also changed into copper (1)-oxide or pure copper.

Since the increased concentration of the lye produces a lowered E. M. F. the lye must be diluted after a discharge of about 13 amp. hours (i. e. when 33 tablets have been used).

A considerable advantage of this cell is that dilution can be carried out simply by turning the cell upside down, pouring out the lye and refilling with tap water. Here the above-mentioned protrusion 3a on the filler 3 prevents just sufficient of the overconcentrated lye from escaping, to that refilling with water again produces the correct concentration. The cell is then ready for use again with a capacity of 13 amp. hours.

After a discharge of about 40 amp. hours the cell must be regenerated by removing the mercury accumulation from the amalgam and electrical re-oxidisation of the copper oxide electrode. The cell is then ready for use again. The electrode material shows no appreciable wear so that it has a long working life.

The battery is not affected by overloading, nor even by short circuits and storage. It is also proof against mechanical shocks. At temperatures as low as minus 16 degrees C. no freezing of the electrolyte is perceptible.

The amalgam tablets are kept in a glass or plastic container after a short immersion in oil. Once coated in oil they can be handled with safety.

The form of execution now to be described differs from the foregoing in that means are provided for substantially complete prevention of self discharge and the cell is chargeable with activating material for a current outlet which may extend over several days, and also the cell is given properties approximating those of a dry cell.

The cell comprises a jar shaped metal casing 100 of nickel-plated sheet iron or the like in which is disposed a wire mesh bag 112 of copper, nickel or iron wire containing a granular copper oxide 101. A perforated metal disk 102, inserted in the casing 100, presses the bag 112 formally against the bottom of the casing to insure a good current transmission. The copper oxide 101 constitutes the positive electrode of the cell and consequently the jar-shaped metal housing 100 is the positive pole.

103 designates the electrolyte consisting for example sodolyte (NaOH) which may be thickened in known manner with flour to approximate a dry electrolyte.

Into this metal casing 100 there is inserted from the top an insert vessel 104 of insulating plastic material in such a manner that it is supported on a ledge 105. The insert vessel is tightly sealed in the casing 100. A copper bar 106 carrying at its lower end a copper wire ring 107 extends out of the insert vessel and forms a negative pole. The bottom of the insert vessel constitutes a diaphragm 109 of porous plastic material or the like capable of holding back the mercury but permitting diffusion of the sodium. Above the diaphragm is placed the mercury electrode 108 which covers the wiring 107, and the dimensions of this structure and the quantity of mercury are such that the cell can operate if desired in an inclined position, or even on its side. The bottom of the insert vessel 104 closed by the diaphragm 109 dips lightly into the electrolyte 103.

The insert vessel 104 is provided in its top with a filling pipe 110 and a screw cap 111.

When sodium preferably in the form of a sodium amalgam tablet (23% of sodium) is dropped into the cell through the filling pipe 110, it floats on the mercury and slowly gives up its sodium thereto. The cell is thus at once rendered operative. Since the amalgam and the sodium mainly float on the mercury electrode, the amalgam concentration at the electrolyte amalgam interface is small. As a consequence there is an extremely small tendency for self discharge. Nevertheless this concentration, which is maintained by the diffusion of the sodium, is sufficient to give a constant current. The charge capacity of the cell is therefore practically hardly less than that of a cell with submerged mercury electrode.

The arrangement of the mercury electrode on the electrolyte surface, that is the prevention according to this invention of a flooding of the mercury surface by the electrolyte, has a further advantage that any foreign materials which may find their way into the cell, will float on the mercury surface owing to their low specific gravity, and will not reach the contact surface between the mercury and the electrolyte to cause self discharge, as they can do in cells with submerged mercury electrodes.

The above described arrangement of the electrodes and the resulting insignificant self discharge gives the further advantage that the cell can be charged with a large quantity of the activating material sufficient to allow current to be taken off for a period of several days. It is also possible to use a thickened electrolyte and therefore to approximate the arrangement of a dry cell, without impairing the basic advantages of the present cell, namely, its unlimited raising property and its readiness for use at any time.

The cells shown in Figures 1, 2 and 3 can be operated in a convenient manner with solid amalgam in tablet form of predetermined weight and size, for example, with tablets of a weight of 2.2 grammes. A tablet of this weight will operate at a working voltage of about 1.1 volt for about 0.5 ampere hour.

The tablets designated 200 in Figures 4 to 6, are rendered stable by being dipped briefly in petroleum, and stored in a box 201. Sufficient petroleum adheres to the tablets to maintain a thin petroleum layer of the tablets remaining in the box after these have been removed one by one as required. This petroleum layer prevents atmospheric attack by air penetrating into the box. 202 designates a suitable adhesive.

I claim as my invention:

1. A galvanic cell comprising an alkali-amalgam electrode as a negative electrode, an alkali lye electrolyte, and a positive electrode consisting of a metal oxide which is practically insoluble in the electrolyte and the metal oxide being selected from the group consisting of $CuO$, $Ag_2O$ and $NiO_2$, the alkali-amalgam electrode being a fluid and in all its parts having a concentration not in excess of 3% of the alkali metal.

2. A galvanic cell according to claim 1, in which the alkali metals are added to the negative electrode as an amalgam.

3. A galvanic cell according to claim 1, in which a solid amalgam is used containing 23 per cent of sodium by weight.

4. A galvanic cell according to claim 1, in which the liquid amalgam electrode contains the alkali metals in a concentration of between 0.8 per cent and 0.5 per cent by weight.

5. A galvanic cell according to claim 1, in which the alkali-amalgam electrode on its entire upper surface is completely covered by the electrolyte.

6. A galvanic cell which has a negative electrode comprising a mercury electrode containing a concentration of an alkali metal of less than 3% by weight, the latter oxidizing while current is being generated and gives the electrode a negative potential, the electrolyte consisting of an alkaline lye and the positive electrode consisting of a metal oxide which is substantially insoluble in the lye and selected from the group consisting of $CuO$, $Ag_2O$ and $NiO_2$, the positive electrode being a wire mesh bag containing granulated copper oxide and is held in contact with the bottom of the cell casing by means of an electrolyte permeable partition inserted in said casing.

7. A galvanic cell which has a negative electrode comprising a mercury electrode containing a concentration of an alkali metal of less than 3% by weight, the latter oxidizing while current is being generated and gives the electrode a negative potential, the electrolyte consisting of an alkaline lye and the positive electrode consisting of a metal oxide which is substantially insoluble in the lye and selected from the group consisting of $CuO$, $Ag_2O$ and $NiO_2$, the mercury electrode being separated by an alkali-permeable diaphragm from the electrolyte, and held above the electrolyte to prevent the latter from covering the mercury surface, and an insert vessel with a closeable filling pipe for the alkali activating material and having a diaphragm forming the bottom of the insert vessel and carrying the negative pole of the cell.

HEINZ PAUL HERMANN WALZ.

References Cited in the file of this patent

UNITED STATES PATENTS

| Number | Name | Date |
|---|---|---|
| 1,015,734 | Heuser | Jan. 23, 1912 |
| 1,015,735 | Heuser | Jan. 23, 1912 |
| 2,492,206 | White et al. | Dec. 27, 1949 |